Patented Oct. 13, 1953

2,655,513

UNITED STATES PATENT OFFICE 2,655,513

PESTICIDAL COMPOUNDS

Morton Kleiman, Chicago, Ill., assignor to Arvey Corporation, a corporation of Illinois No Drawing. Application July 5, 1952,
Serial No. 297,397

4 Claims. (Cl. 260—346.2)

This invention relates to a new group of compositions of matter. More specifically, this invention relates to a group of compounds characterized in part by their having a partially hydrogenated naphthalene structure with the 1,4 and 5,8 carbon atoms thereof being bridged respectively by an endomethano group and an oxygen bridge, and further characterized by being hexahalogenated in fixed and known positions. The compounds of the present invention are, therefore, hexahalo-1,4-methano-5,8-oxahexahydronaphthalenes.

The chemical nomenclature used herein to name the compounds of the present invention conforms with the rules and examples set forth in "The Ring Index" by Patterson and Capell, A. C. S. Monograph Series, No. 84, 1940.

The compounds of the present invention are unexpectedly active pesticidally, and have proved to be very valuable insecticides from the standpoints both of immediate and residual control of insect pests.

Broadly, the products of the present invention are prepared by reacting a furan with a hexahalobicyclo-[2.2.1]-2,5-heptadiene. The reaction is of a Diels-Alder type with the furan component reacting as the diene. In the present case "a furan" is meant to include those compounds having the basic conjugated dienic, heterocyclic structure such as furan, 2-methyl furan, and 2,5-dimethyl furan.

1,2,3,4,7,7 - hexachlorobicyclo - [2.2.1] - 2,5-heptadiene, which is a starting material in the process, may be prepared by reacting hexachlorocyclopentadiene with vinyl chloride to form the Diels-Alder adduct of these components and then dehydrohalogenating said adduct. Example I illustrates a specific method for preparing this bicyclic diene.

EXAMPLE I (a) Hexachlorocyclopentadiene (2,205 g.; 8.1 moles) was placed into a 2-liter, 3-necked flask equipped with a stirrer, thermometer and reflux condenser containing a gas inlet tube equipped with a sparger extending below the surface of the hexachlorocyclopentadiene. While maintaining the hexachlorocyclopentadiene at 200° C., vinyl chloride was bubbled through it continuously for a period of 14 hours. During this period 482 g. (7.7 moles) of vinyl chloride reacted with the hexachlorocyclopentadiene. The product of this reaction, 1,2,3,4,5,7,7-heptachlorobicyclo-[2.2.1]-2-heptene, was purified by vacuum fractional distillation. The product distilled at 147–148° C. (stillhead temperature) at a pressure (absolute) of 12 mm. of mercury.

(b) 1,2,3,4,5,7,7 - heptachlorobicyclo - [2.2.1]-2-heptene (33.5 g.) was added to a refluxing solution of KOH (8 grams) in absolute ethanol (100 ml.). Heating was continued to maintain the mixture at reflux temperature for three additional hours. After this time the ethanol was removed by evaporation in vacuo and the residue taken up in hexane. The hexane solution was filtered to remove KCl and unreacted KOH. The hexane was removed from the filtrate by distillation, and the residue, containing the desired bicycloheptadiene product, was purified by vacuum fractional distillation with said product being recovered at a temperature of 128–130° C. under 7.0 mm. mercury pressure (absolute).

Example II illustrates the preparation of 1,2,3,4,10,10 - hexachloro - 1,4 - methano - 5,8-oxa-1,4,4a,5,8,8a - hexahydronaphthalene, utilizing the product of Example I.

EXAMPLE II 1,2,3,4,7,7 - hexachlorobicyclo - [2.2.1] - 2,5-heptadiene (0.2 mole; 59.8 g.) was heated to 165° C. in a 200 ml. 3-necked flask equipped with a stirrer, reflux condenser, dropping funnel and thermometer. Furan (25 ml.) was slowly added beneath the surface of the heated heptadiene over a four-hour period. On standing overnight the product crystallized out of the cooled reaction mixture. The mixture was filtered and the crystals were washed with pentane and then were twice recrystallized from methanol. The thus purified product melted at 138.7–139.6° C. The following elementary analysis was obtained:

|  | C | H | Cl |
| --- | --- | --- | --- |
|  | Percent | Percent | Percent |
| Analysis of product | 36.26 | 1.92 | 57.85 |
| Calculated for $C_{11}H_6Cl_6O$ | 36.01 | 1.65 | 57.98 |

The product is the 1:1 Diels-Alder adduct of 1,2,3,4,7,7 - hexachlorobicyclo - [2.2.1]-2,5-heptadiene with furan, said furan reacting as the diene component.

Other furans, such as 2-methyl furan, and 2,5-dimethylfuran may be substituted for the specific furan utilized in Example II. The reaction in any case involves an equimolar adduction of the reactants utilized, namely, hexachlorobicycloheptadiene and a furan. While hexachlorobicycloheptadiene has two double bonds, only the unsubstituted one (i. e., the carbon atoms of which have hydrogen attached thereto) is reactive in the present case and therefore no special precautions need be taken to avoid reaction at the substituted double bond.

In view of the foregoing, an equimolar ratio of reactants, or an excess of the furan (dienic component) is preferred. Lesser proportions of the furan component may be utilized, but such would result in an incomplete utilization of the bicyclic component and is therefore uneconomical.

The reaction temperature is not critical in that it may vary over a range of temperatures. Thus, a furan can be adducted with hexachlorobicyclo-[2.2.1]-2,5-heptadiene at temperatures between about 100° C. to about 200° C. Excessively high temperatures may cause some decomposition and are therefore undesirable. The use of lower temperatures merely reduces the rate of reaction. Temperatures between about 125° C. and about 185° C. are eminently suited insofar as rate of reaction and quality of product are concerned.

As is the case with most chemical reactions, the rate thereof is proportional to the temperature. The reaction time may vary between about ½ to about 10 or more hours, depending on the temperature employed. When employing temperatures in the lower portion of the range, the time required to complete the reaction may be about 10 or more hours. The use of more elevated temperatures substantially reduces the length of time. Excess time is not harmful since after reaction has taken place the product is reasonably stable. Less time than is required to complete the reaction only results in having some unreacted components in the reaction mixture, but does not affect the obtaining of the desired product.

The reaction is preferably carried out in the absence of solvent; however, where temperature control is desired, the use of a solvent boiling at approximately the temperature of reaction may be used and may be preferred. The solvents useful in the present process are many; it being only desired that such solvent be not reactive under the conditions utilized and that its solvency characteristics be such as to at least partially dissolve the reacting components. Hydrocarbon solvents, both aliphatic and aromatic, chlorinated solvents, alcohols, ethers, esters and the like, are suitable. Specifically, benzene, toluene, xylene, hexane, heptane, carbon tetrachloride, chloroform, ethanol, diethyl ether, etc., are useful solvents in the present process.

Pressure techniques may also be utilized to prepare the products of the present invention. Thus the reactants can be placed in a pressure vessel and reacted under the pressure generated by the vapor of the reactants and solvent (if the latter be utilized). Since the reaction involves the formation of 1 mole of product per 2 moles reactant, the application of pressure is desirable.

Exemplifying the use of a pressure vessel, Example III shows how 1,2,3,4,10,10-hexachloro-1,4-methano-5-methyl-5,8-oxa-1,4,4a,5,8,8a-hexahydronaphthalene may be prepared from 2-methylfuran and hexachlorobicyclo-[2.2.1]-2,5-heptadiene.

EXAMPLE III 1,2,3,4,7,7-hexachlorobicyclo-[2.2.1]-2,5-heptadiene is placed in a pressure vessel and heated to 155° C. An equal molar quantity of 2-methylfuran is pumped into the vessel over a one-hour period and the reaction mixture maintained at about 155° C. for about 4 additional hours. After this period, the reaction vessel is allowed to cool and the desired product is isolated and purified by repeated crystallization from methanol.

Likewise, reaction with 2,5-dimethylfuran and said heptadiene results in 1,2,3,4,10,10-hexachloro-1,4-methano-5,8-dimethyl-5,8-oxa-1,4,4a,5,8,8a-hexahydronaphthalene.

The compounds of the present invention possess superior insecticidal activity to a wide variety of insect pests. For example, Table I shows the toxicity of 1,2,3,4,10,10-hexachloro-1,4-methano-5,8-oxa-1,4,4a,5,8,8a-hexahydronaphthalene to 3rd instar southern armyworm larvae. This table indicates the percentage mortality at two low dosage levels with two replicates for each dosage level. The application was made by dipping bean leaves in wettable powder suspensions of the toxicant and allowing the larvae to contact the leaves.

*Table I*

| Concentration of toxicant in pounds per 100 gallons | Percentage knockdown after— | | |
|---|---|---|---|
| | 24 hrs. | 48 hrs. | 72 hrs. |
| 4 | 100 | 100 | 100 |
| | 100 | 100 | 100 |
| 1 | 100 | 100 | 100 |
| | 90 | 100 | 100 |

Table II shows the toxicity of this compound to adult female German roaches, using 10 roaches per test and providing water and roost. The toxicant was applied by injection.

*Table II*

| Dosage in micrograms of toxicant | Percentage paralyzed after— | | | |
|---|---|---|---|---|
| | 24 hrs. | 48 hrs. | 72 hrs. | 96 hrs. |
| 0.5 | 100 | 100 | 100 | 100 |
| | 100 | 100 | 100 | 100 |
| | 100 | 100 | 100 | 100 |
| | 90 | 90 | 90 | 90 |
| 1.0 | 100 | 100 | 100 | 100 |
| | 100 | 100 | 100 | 100 |
| 5.0 | 100 | 100 | 100 | 100 |
| | 100 | 100 | 100 | 100 |
| 10.0 | 100 | 100 | 100 | 100 |
| | 100 | 100 | 100 | 100 |

Table III shows the toxicity of this material to adult Tribolium recorded after 24, 48, and 72 hours' exposure to filter paper dipped in a solution of the toxicant in acetone and dried four hours.

*Table III*

| Percentage toxicant in acetone | Percentage knockdown after— | | |
|---|---|---|---|
| | 24 hrs. | 48 hrs. | 72 hrs. |
| 0.25 | 100 | 100 | 100 |
| | 100 | 100 | 100 |
| 5.00 | 100 | 100 | 100 |
| | 100 | 100 | 100 |

Table IV shows the percentage knockdown among third instar milkweed bugs recorded after 24, 48, and 72 hours' exposure to filter paper dipped in a solution of the toxicant in acetone and dried four hours. Ten insects were used per replicate and they were retained in the test cages continuously for 72 hours with food and water.

Table IV

| Percentage toxicant in acetone | Percentage knockdown after— | | |
|---|---|---|---|
| | 24 hrs. | 48 hrs. | 72 hrs. |
| 0.25 | 100 | 100 | 100 |
| | 100 | 100 | 100 |
| 5.0 | 100 | 100 | 100 |
| | 100 | 100 | 100 |

Table V shows the percentage knockdown among adult granary weevils recorded after 24, 48, and 72 hours' exposure to filter paper dipped in a solution of the toxicant in acetone and dried four hours. Twenty insects were used per replicate and they were retained in the test cages continuously for 72 hours without food, but provided with water after 24 hours.

Table V

| Percentage toxicant in acetone | Percentage knockdown after— | | |
|---|---|---|---|
| | 24 hrs. | 48 hrs. | 72 hrs. |
| 0.25 | 100 | 100 | 100 |
| | 100 | 100 | 100 |
| 5.0 | 100 | 100 | 100 |
| | 100 | 100 | 100 |

Table VI shows the percentage knockdown among adult male German roaches recorded after 24, 48, and 72 hours' exposure to strips of corrugated paper dipped in a solution of the toxicant in acetone and dried twenty-four hours. Twenty insects were used per replicate and they were retained in the test cages continuously for 72 hours with food and water.

Table VI

| Percentage toxicant in acetone | Percentage knockdown after— | | |
|---|---|---|---|
| | 24 hrs. | 48 hrs. | 72 hrs. |
| 0.5 | 100 | 100 | 100 |
| | 100 | 100 | 100 |
| | 100 | 100 | 100 |

It is evident from these data that the compounds of the present invention are unusually versatile and exhibit a high degree of toxicity to many and varied types of insect pests. They thus have added utility in being utilizable in many fields of application in the agricultural and household field.

The compounds of the present invention may be utilized and applied as a sole active ingredient dispersed in carriers such as dusts, solvents, aqueous dispersions or other carriers frequently used in the art. In addition, the compounds of the present invention can be used in combination with other insecticides or fungicides.

I claim as my invention:

1. As a new composition of matter a compound of the group consisting of 1,2,3,4,10,10-hexachloro - 1,4 - methano - 5,8 - oxa - 1,4,4a,5,8,8a-hexahydronaphthalene; 1,2,3,4,10,10-hexachloro-1,4-methano - 5 - methyl - 5,8 - oxa-1,4,4a,5,8,8a-hexahydronaphthalene; and 1,2,3,4,10,10-hexachloro -1,4- methano -5,8- dimethyl -5,8- oxa-1,4,4a,5,8,8a-hexahydronaphthalene.

2. 1,2,3,4,10,10 - hexachloro -1,4- methano - 5,8-oxa-1,4,4a,5,8,8a-hexahydronaphthalene.

3. 1,2,3,4,10,10 - hexachloro - 1,4 - methano - 5-methyl - 5,8 - oxa - 1,4,4a,5,8,8a - hexahydronaphthalene.

4. 1,2,3,4,10,10 - hexachloro -1,4- methano - 5,8-dimethyl - 5,8 - oxa - 1,4,4a,5,8,8a - hexahydronaphthalene.

MORTON KLEIMAN.

No references cited.